(12) United States Patent
Huang et al.

(10) Patent No.: US 10,809,838 B1
(45) Date of Patent: Oct. 20, 2020

(54) TOUCH PAD MODULE

(71) Applicant: PRIMAX ELECTRONICS LTD., Taipei (TW)

(72) Inventors: Tai-Sou Huang, Taipei (TW); Shao-Ju Yen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/547,692

(22) Filed: Aug. 22, 2019

(30) Foreign Application Priority Data

Jul. 12, 2019 (TW) .............................. 108124747 A

(51) Int. Cl.
*G06F 3/041* (2006.01)
*G06F 3/0354* (2013.01)

(52) U.S. Cl.
CPC ........ *G06F 3/0412* (2013.01); *G06F 3/03547* (2013.01)

(58) Field of Classification Search
CPC ........................... G06F 3/0412; G06F 3/03547
See application file for complete search history.

(56) References Cited

U.S. PATENT DOCUMENTS

| 2013/0127782 A1* | 5/2013 | Lochner | H03K 17/962 |
| | | | 345/174 |
| 2015/0071509 A1* | 3/2015 | Myers | G06K 9/0002 |
| | | | 382/124 |

* cited by examiner

*Primary Examiner* — Aneeta Yodichkas
(74) *Attorney, Agent, or Firm* — WPAT, PC

(57) ABSTRACT

The present invention provides a touch pad module applicable to an electronic apparatus, including: a support frame, a touch pad, an elastomer structure, and a baseplate. The touch pad is movably configured in a first opening of the support frame; the elastomer structure is fixed on a lower surface of the touch pad and covers a press switch of the touch pad; and the baseplate is fixed on a lower surface of the support frame and provided with a limiting groove corresponding to the elastomer structure. A bottom surface of the limiting groove is provided with an adjustment hole, and a relative position of an adjustment member to an elastic member of the elastomer structure may be adjusted by using the adjustment hole.

13 Claims, 5 Drawing Sheets

TOUCH PAD MODULE

FIELD OF THE INVENTION

The present invention relates to the application field of input modules, in particular to a touch pad module applied to an electronic apparatus.

BACKGROUND OF THE INVENTION

A touch pad is an input module having a smooth panel on which fingers may press or slide to control operation of an electronic apparatus. Being very light and thin, the touch pad is often applied to a notebook computer, a mobile phone, a PDA, or other electronic apparatuses.

A touch pad module is obtained by stacking and assembling by a plurality of layers of materials, for example, a cover, a circuit board, and a support structure. However, each layer of material often has a certain tolerance, so that a press stroke of the touch pad may change due to a tolerance of the layered structure.

Therefore, how to provide a touch pad module, so that a press stroke of a touch pad does not change due to a tolerance of the layered structure is a technical problem to be resolved by the present invention.

SUMMARY OF THE INVENTION

A major objective of the present invention is to provide a touch pad module with an adjustment apparatus, and the touch pad module can correct, by using the adjustment apparatus, a tolerance caused by a layered structure of a touch pad.

To achieve the objective, the present invention provides a touch pad module, applicable to an electronic apparatus, and including:
a support frame, provided with a first opening running through the support frame;
a touch pad, movably configured in the first opening, where a lower surface of the touch pad is provided with a press switch;
an elastomer structure, used to trigger the press switch, and including:
an elastic member, fixed on the lower surface of the touch pad and covering the press switch; and
an adjustment member, adjustably disposed on one end of the elastic member away from the touch pad; and
a baseplate, fixed on a lower surface of the support frame and provided with a limiting groove corresponding to the adjustment member, where the adjustment member abuts on a bottom surface of the limiting groove, where
the bottom surface of the limiting groove is provided with an adjustment through hole, and a relative position of the adjustment member to the elastic member can be adjusted by using the adjustment hole.

In a preferred implementation, the touch pad includes a circuit board and a cover disposed on the circuit board, and the press switch is located on a lower surface of the circuit board.

In a preferred implementation, the elastic member includes an elastic support portion and a end connected thereto, the elastic support portion is used to be combined with the circuit board and cover the press switch, and the adjustment member is adjustably disposed on the end.

In a preferred implementation, the end is provided with a screw hole.

In a preferred implementation, the adjustment member is provided with a screw rod and a head connected thereto, and the screw rod is adjustably disposed in the screw hole.

In a preferred implementation, a driving groove is provided on another surface of the head opposite to the connected screw rod, and the driving groove corresponds to the adjustment hole.

In a preferred implementation, the end is a screw rod.

In a preferred implementation, the adjustment member is provided with a screw hole corresponding to the end, and the adjustment member is adjustably sleeved over the end by using the screw hole.

In a preferred implementation, the adjustment member is provided with a driving groove on another surface opposite to the screw hole, and the driving groove corresponds to the adjustment hole.

In a preferred implementation, the lower surface of the support frame is provided with a groove, the groove is used to accommodate the baseplate, and the first opening is provided in the groove.

In a preferred implementation, two first locking holes are provided on a bottom surface of the groove, and the first locking holes are located around the first opening.

In a preferred implementation, the baseplate is provided with two second locking holes, and the two locking holes run through the baseplate and respectively correspond to the first locking holes.

In a preferred implementation, the touch pad module further includes two locking members, where each locking member runs through the second locking hole and the first locking hole sequentially, to fix the baseplate in the groove.

In a preferred implementation, the baseplate further includes a second opening running through the baseplate.

In a preferred implementation, the electronic apparatus is: a notebook computer, a keyboard, a mobile phone, a PDA, a handwriting tablet, or a graphics tablet.

Beneficial effects of the present invention are that, the elastomer structure used to trigger a key switch is provided with the elastic member and the adjustment member, and the adjustment member can be used to adjust a deformation range of the elastic member under a force, to correct a tolerance caused by a layered structure of the touch pad, so that a press stroke of the touch pad module does not change due to the tolerance of the layered structure.

DETAILED DESCRIPTION OF THE PREFERRED EMBODIMENT

Advantages, features, and implementations thereof of the present invention may be described in detail with reference to illustrative embodiments and the accompanying drawings, so that the advantages, the characteristics, and the method are easier to understand. However, the present invention may be implemented in different forms, and shall not be understood as being limited to only embodiments described herein. On the contrary, for a person of ordinary skill in the art, the provided embodiments will make the disclosure more thoroughly, comprehensively, and completely describe the scope of the present invention.

Figure 1A:
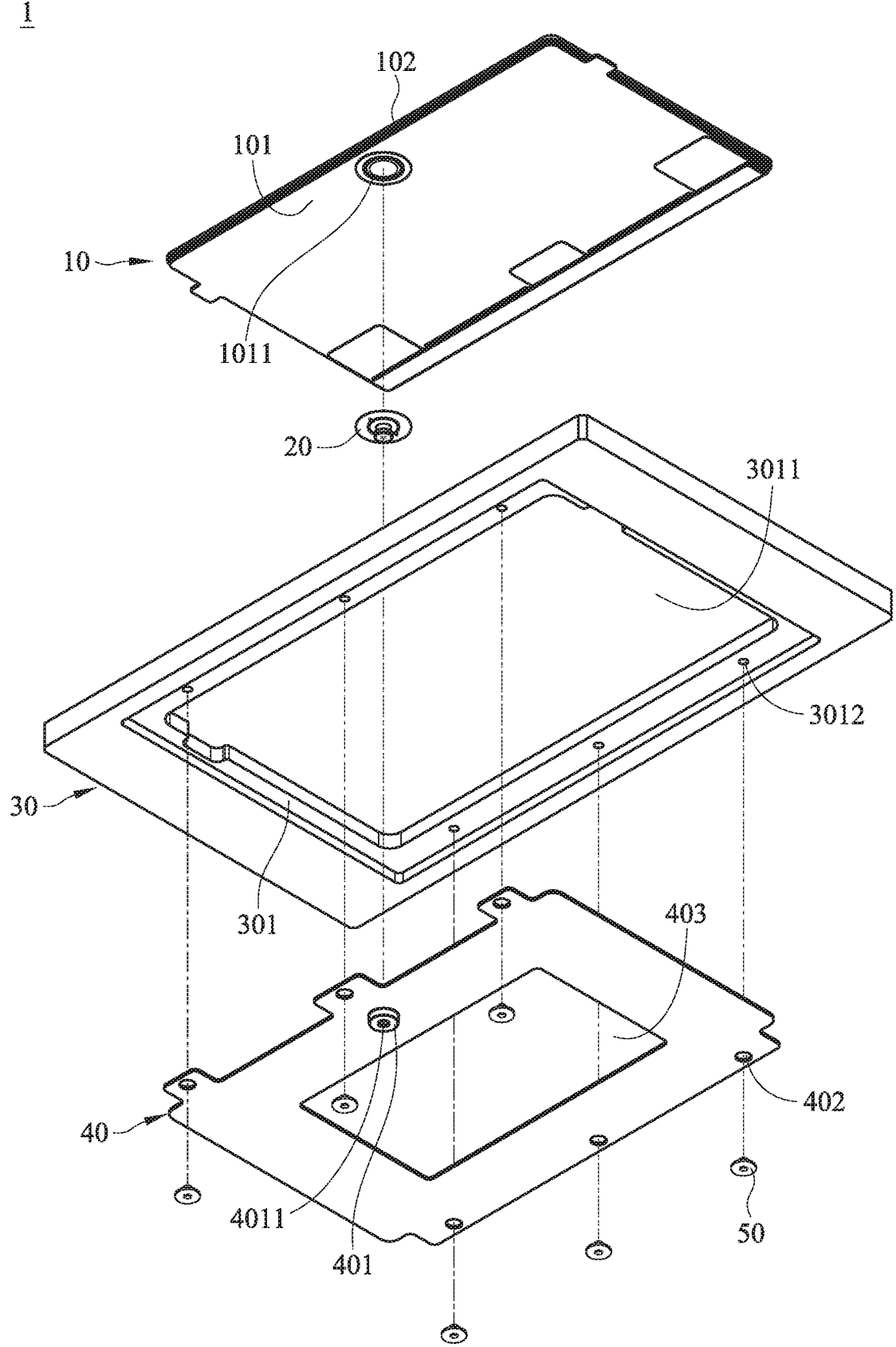
FIG. 1A is a three-dimensional exploded view of a touch pad module at a viewing angle according to the present invention.
Figure 1B:
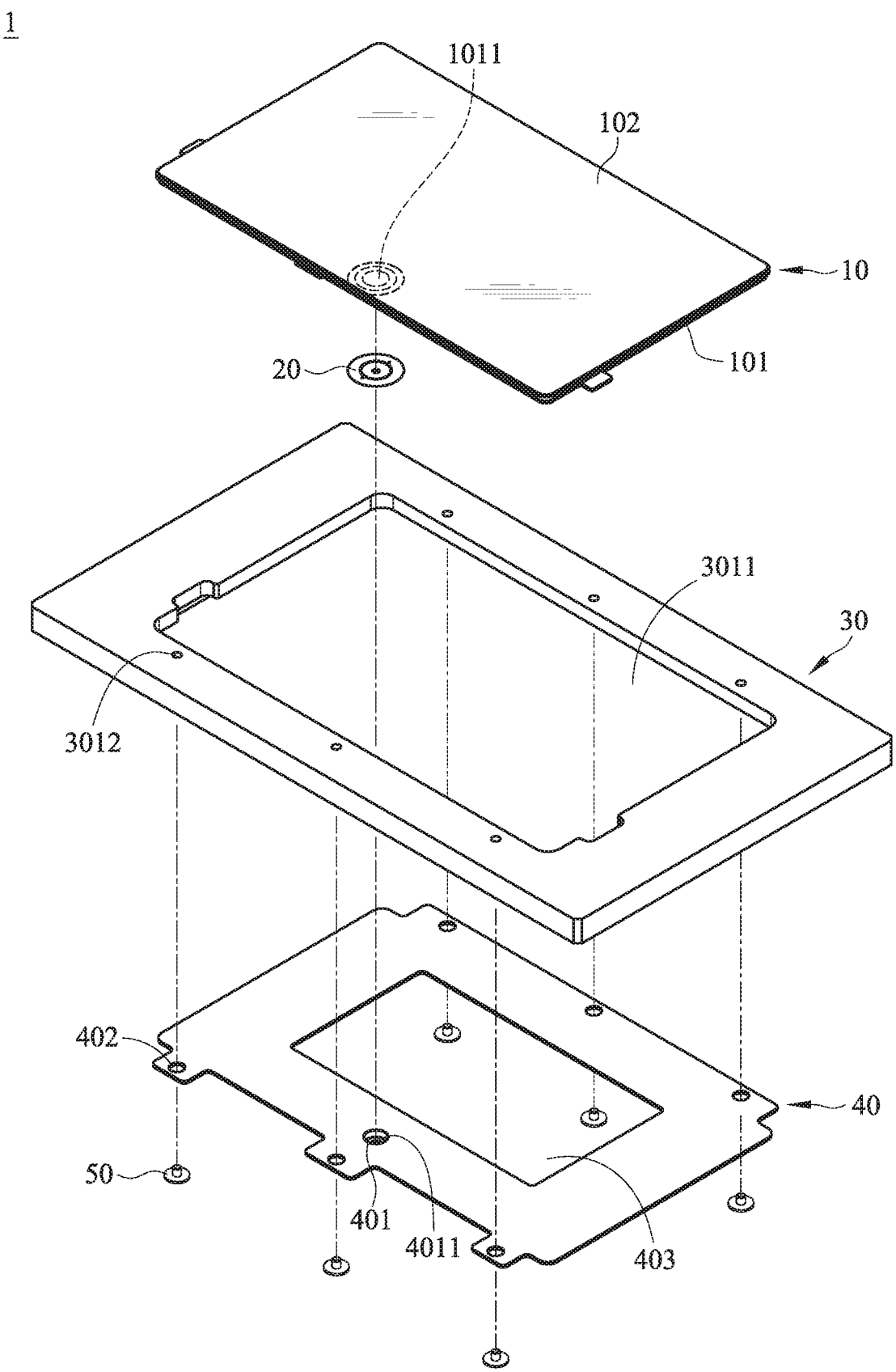
FIG. 1B is a three-dimensional exploded view of a touch pad module at another perspective according to the present invention.

First, refer to FIG. 1A and FIG. 1B. FIG. 1A is a three-dimensional exploded view of a touch pad module at a viewing angle according to the present invention; and FIG. 1B is a three-dimensional exploded view of a touch pad module at another perspective according to the present invention. The touch pad module 1 is applicable to an electronic apparatus, for example: a notebook computer, a keyboard, a mobile phone, a PDA, a handwriting tablet, or a graphics tablet. The touch pad module 1 includes: a touch pad 10, an elastomer structure 20, a support frame 30, a baseplate 40, and a locking member 50.

The touch pad 10 includes a circuit board 101 and a cover 102 disposed on the circuit board 101, and a lower surface of the circuit board 101 is provided with a press switch 1011. The cover 102 may be fixed on an upper surface of the circuit board 101 by means of bonding, and a user may press or slide by fingers on the cover 102. In this embodiment, a material of the cover 102 may be: ceramic or glass, and in another preferred implementation, the cover 102 may be made of sapphire glass.

The elastomer structure 20 is fixed on the lower surface of the circuit board 101 and covers the press switch 1011. When the elastomer structure 20 deforms under a force, the press switch 1011 may be contacted and triggered to generate a corresponding press signal.

A lower surface of the support frame 30 is provided with a groove 301, where the groove 301 is used to accommodate the baseplate 40, and the groove 301 is provided with a first opening 3011 running through the support frame 30. In this embodiment, two or more first locking holes 3012 are provided on a bottom surface of the groove 301, and the first locking holes 3012 are located around the first opening 3011.

The baseplate 40 includes a limiting groove 401, two or more second locking holes 402, and a second opening 403. The limiting groove 401 is disposed corresponding to the elastomer structure 20, and a bottom surface of the limiting groove 401 is provided with an adjustment through hole 4011. The second locking holes 402 run through the baseplate 40, and each second locking hole 402 is disposed corresponding to each first locking hole 3012. In this embodiment, the second locking holes 402 are disposed on a plurality of protruding parts at a side edge of the baseplate 40. The second openings 403 run through the baseplate 40 and are located at or near the center of the baseplate 40, and the second opening 403 can be used to reduce a weight of the baseplate 40.

Still referring to FIG. 1A and FIG. 1B, the touch pad 10 is movably configured in the first opening 3011 of the support frame 30. For example, the touch pad 10 can be combined with the support frame 30 by using a hinge structure (not shown) or an elastic connecting structure (not shown), so that the touch pad 10 configured in the first opening 3011 may swing or move up and down in a vertical direction relative to the support frame 30. The locking member 50 runs through the second locking hole 402 and the first locking hole 3012 sequentially, to fix the baseplate 40 in the groove 301 on the lower surface of the support frame 30. Although this embodiment provides only an implementation of combining the baseplate 40 and the support frame 30 by means of locking, in practical application, the baseplate 40 and the support frame 30 may alternatively be combined by means of bonding, welding, or buckling. In another implementation, the baseplate 40 and the support frame 30 may be integrally formed. In some possible implementations, the lower surface of the support frame 30 is not provided with a design of the groove 301, and the baseplate 40 is directly fixed on the lower surface of the support frame 30.

When the user presses the touch pad 10 by pressing the cover 102, an end of the elastomer structure 20 away from the circuit board 101 abuts on the bottom surface of the limiting groove 401, the elastomer structure 20 is deformed by the press of the baseplate 40, and the press switch 1011 may be contacted and triggered to enable the touch pad module 1 to generate a corresponding press signal; and when the touch pad 10 is released, the touch pad 10 returns to its original position, at this time, the elastomer structure 20 recovers elasticity, and the end of the elastomer structure 20 away from the circuit board 101 continues to abut on the bottom surface of the limiting groove 401.

Figure 2A:
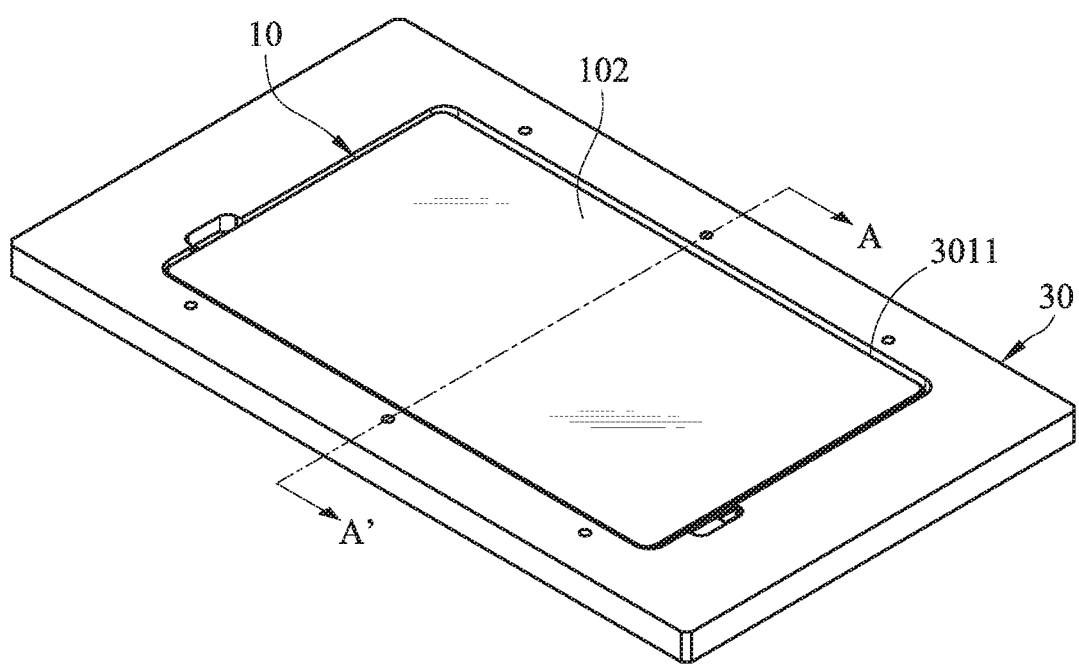
FIG. 2A is a three-dimensional schematic diagram of a touch pad module according to the present invention.
Figure 2B:
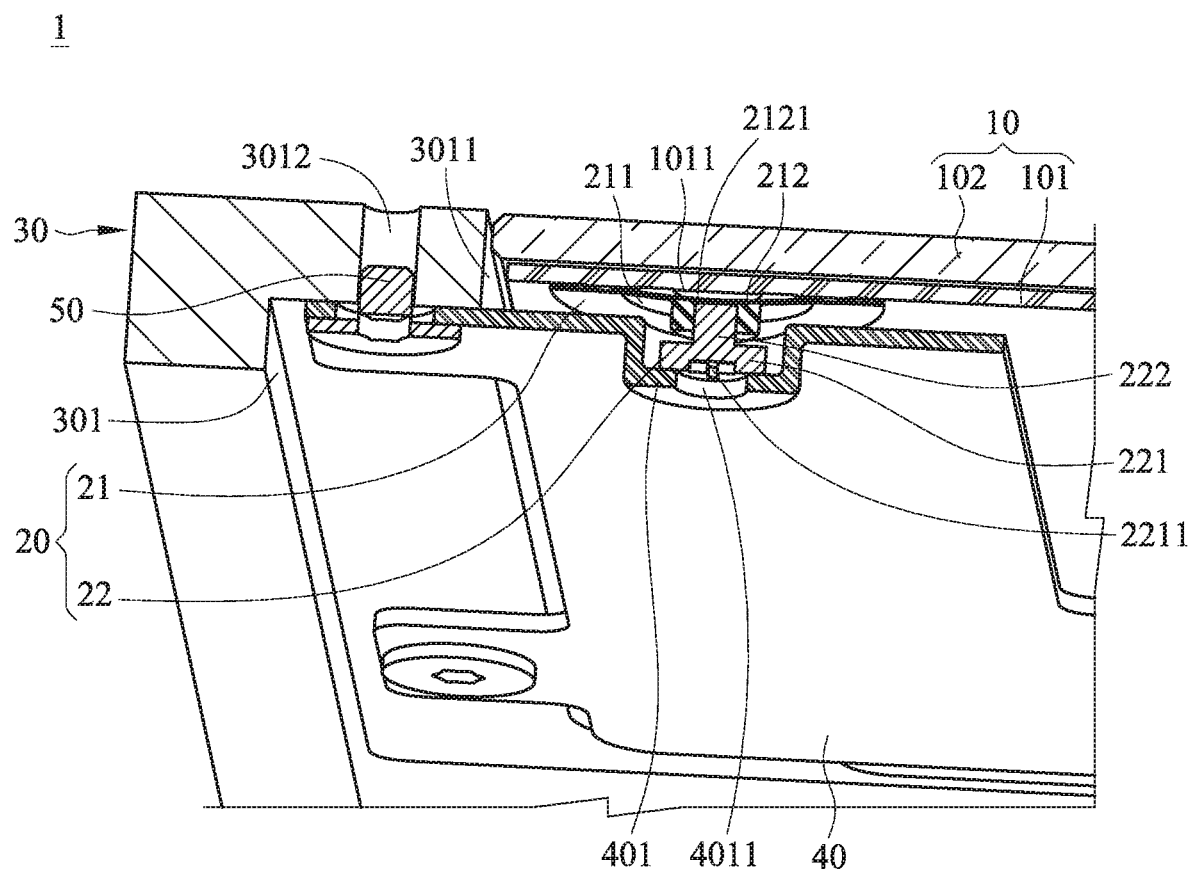
FIG. 2B is a schematic cross-sectional view of the touch pad module in FIG. 2A taken along a line segment A-A'.

Referring to FIG. 2A and FIG. 2B, FIG. 2A is a three-dimensional schematic diagram of the touch pad module according to the present invention; and FIG. 2B is a schematic cross-sectional view of the touch pad module in FIG. 2A taken along a line segment A-A'. In FIG. 2B, the elastomer structure 20 includes an elastic member 21 and an adjustment member 22, and the adjustment member 22 is adjustably disposed on an end of the elastic member 21 away from the touch pad 10. The elastic member 21 includes an elastic support portion 211 and an end 212 connected thereto. The elastic support portion 211 is used to be combined with the circuit board 101 and cover the press switch 1011, the end 212 is provided with a screw hole 2121, and the screw hole 2121 is provided with an internal thread structure (not shown). In this embodiment, the elastic member 21 is made of an elastic material, and the elastic support portion 211 and the end 212 are integrally formed. Alternatively, the elastic support portion 211 is a metal dome, the end 212 is made of a plastic material, and the end 212 may be fixed on the elastic support portion 211 by means of injection or bonding.

On the other hand, the adjustment member 22 is provided with a screw rod 222 and a head 221 connected thereto. The screw rod 222 is provided with an external thread structure (not shown) corresponding to the internal thread structure of the screw hole 2121, so that the screw rod 222 is adjustably disposed in the screw hole 2121. In addition, another surface of the head 221 opposite to the connected screw rod 222 abuts on the bottom surface of the limiting groove 401, and a driving groove 2211 corresponding to the adjustment hole 4011 of the limiting groove 401 is disposed on the surface. The driving groove 2211 may be: slot-shaped, cross-shaped, double cross-shaped, square, hexagonal, star-shaped, or torx-shaped. Therefore, when a tolerance caused by a layered structure of the touch pad 10 needs to be corrected, an adjustment tool (not shown), for example, a screwdriver, may be used to insert in the adjustment hole 4011 and clamp on the driving groove 2211 of the head 221, to turn around the adjustment member 22 to adjust a relative position of the adjustment member 22 to the elastic member 21. For example, when the adjustment tool is used to turn around the adjustment member 22 in a counterclockwise direction, the head 221 abutting on the bottom surface of the limiting groove 401 may gradually move away from the end 212, the screw rod 222 drives the end 212 to move towards the circuit board 101, and the elastic support portion 211 is gradually compressed and moves close to the press switch 1011, to shorten the press stroke of the touch pad 10. When the adjustment tool is used to turn around the adjustment member 22 in a clockwise direction, the head 221 abutting on the bottom surface of the limiting groove 401 may gradually move close to the end 212, the screw rod 222 drives the end 212 to move away from the circuit board 101, and the elastic support portion 211 is gradually released elastically and moves away from the press switch 1011, to extend the press stroke of the touch pad 10.

Figure 3:
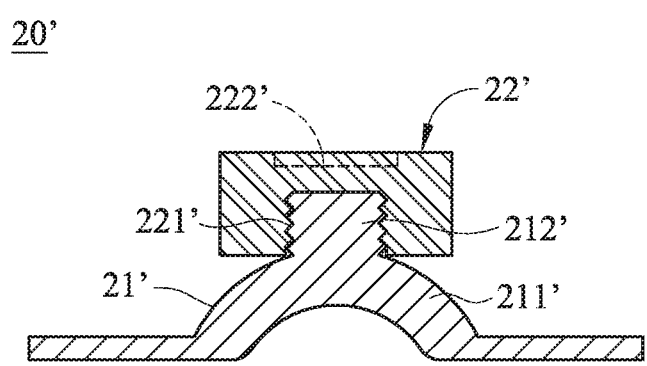
FIG. 3 is a schematic cross-sectional view of another embodiment of an elastomer structure according to the present invention.

Referring to FIG. 3, FIG. 3 is a schematic cross-sectional view of another embodiment of an elastomer structure of the present invention. In FIG. 3, the elastomer structure 20' further includes an elastic member 21' and an adjustment member 22'. A function of the elastomer structure 20' is the same as a function of the elastomer structure 20 in FIG. 2B, and details are not described herein. However, a difference between FIG. 3 and FIG. 2B lies in that, an end 212' of the elastic member 21' is a screw rod provided with an external thread structure (not shown); and the adjustment member 22' is provided with a screw hole 221' corresponding to the end 212'. The screw hole 221' is provided with an internal thread structure (not shown) corresponding to the external thread structure of the end 212', so that the adjustment member 22' is adjustably sleeved over the end 212' by using the screw hole 221'. For example, the adjustment member 22' may be a nut, and an adjustment tool may insert in the adjustment hole 4011 (as shown in FIG. 2B) and clamp on a driving groove 222' of the adjustment member 22', to turn around the adjustment member 22' to adjust a relative position of the adjustment member 22' to the elastic member 21'.

Compared with the prior art, the elastomer structure of the touch pad module provided by the present invention is provided with the elastic member and the adjustment member, and the adjustment member can be used to adjust a deformation range of the elastic member under a force, to correct a tolerance caused by a layered structure of the touch pad, so that the press stroke of the touch pad module does not change due to the tolerance of the layered structure. Therefore, the present invention is a creation of great industrial value.

The present invention may be modified in various ways by a person skilled in the art. However, all the modifications still fall within the protection scope of the appended claims.

What is claimed is:

1. A touch pad module, applicable to an electronic apparatus, and comprising:
   a support frame, provided with a first opening running through the support frame;
   a touch pad, movably configured in the first opening, wherein a lower surface of the touch pad is provided with a press switch;
   an elastomer structure, used to trigger the press switch, and comprising:
      an elastic member, fixed on the lower surface of the touch pad and covering the press switch; and
      an adjustment member, adjustably disposed on and in contact with one end of the elastic member away from the touch pad,
   wherein the end of the elastic member is provided with a screw hole, and the adjustment member is provided with a screw rod corresponding to the screw hole of the elastic member, or
   the end of the elastic member is provided with a screw rod, and the adjustment member is provided with a screw hole corresponding to the screw rod of the elastic member; and
   a baseplate, fixed on a lower surface of the support frame and provided with a limiting groove corresponding to the adjustment member, wherein the adjustment member abuts on a bottom surface of the limiting groove, wherein the bottom surface of the limiting groove is provided with an adjustment through hole, and a relative position of the adjustment member to the elastic member can be adjusted by using the adjustment hole.

2. The touch pad module according to claim 1, wherein the touch pad comprises a circuit board and a cover disposed on the circuit board, and the press switch is located on a lower surface of the circuit board.

3. The touch pad module according to claim 2, wherein the elastic member comprises an elastic support portion connected to the end, and the elastic support portion is used to be combined with the circuit board and cover the press switch.

4. The touch pad module according to claim 1, wherein the end of the elastic member is provided with the screw hole, and the adjustment member is further provided with a head connected to the screw rod, and the screw rod is adjustably disposed in the screw hole.

5. The touch pad module according to claim 4, wherein a driving groove is provided on another surface of the head opposite to the connected screw rod, and the driving groove corresponds to the adjustment hole.

6. The touch pad module according to claim 1, wherein the end of the elastic member is provided with the screw rod, and the adjustment member is provided with the screw hole, and the adjustment member is adjustably sleeved over the end by using the screw hole.

7. The touch pad module according to claim 6, wherein the adjustment member is provided with a driving groove on another surface opposite to the screw hole, and the driving groove corresponds to the adjustment hole.

8. The touch pad module according to claim 1, wherein the lower surface of the support frame is provided with a groove, the groove is used to accommodate the baseplate, and the first opening is provided in the groove.

9. The touch pad module according to claim 8, wherein at least two first locking holes are provided on a bottom surface of the groove, and the at least two first locking holes are located around the first opening.

10. The touch pad module according to claim 9, wherein the baseplate is provided with at least two second locking holes, and the at least two second locking holes run through the baseplate and respectively correspond to the at least two first locking holes.

11. The touch pad module according to claim 10, further comprising at least two locking members, wherein each locking member runs through the second locking hole and the first locking hole sequentially, to fix the baseplate in the groove.

12. The touch pad module according to claim 1, wherein the baseplate further comprises a second opening running through the baseplate.

13. The touch pad module according to claim 1, wherein the electronic apparatus is: a notebook computer, a keyboard, a mobile phone, a PDA, a handwriting tablet, or a graphics tablet.

* * * * *